United States Patent [19]

Smart

[11] Patent Number: 4,566,337
[45] Date of Patent: Jan. 28, 1986

[54] OPTO-ELECTRONIC POSITION SENSING

[75] Inventor: Michael G. Smart, Camberley, England

[73] Assignee: G. A. Platon Limited, Hampshire, England

[21] Appl. No.: 634,024

[22] Filed: Jul. 24, 1984

[30] Foreign Application Priority Data

Jul. 28, 1983 [GB] United Kingdom ............... 8320405

[51] Int. Cl.⁴ ..................... G01F 1/26; G01N 21/84
[52] U.S. Cl. ........................ 73/861.56; 250/222.1; 250/577
[58] Field of Search ............. 73/293, 861.56, 861.57; 250/222.1, 577

[56] References Cited

U.S. PATENT DOCUMENTS

| | | | |
|---|---|---|---|
| 2,503,091 | 4/1950 | Brooke, Jr. et al. | 73/DIG. 11 |
| 2,882,520 | 4/1959 | Hess | 73/293 |
| 3,582,662 | 6/1971 | Soika | 73/861.56 X |
| 3,699,560 | 10/1972 | Meunier et al. | 73/861.56 X |
| 4,084,426 | 4/1978 | Gales | 73/293 X |
| 4,200,806 | 4/1980 | Walker et al. | 250/577 |
| 4,335,618 | 6/1982 | Bucsky et al. | 73/861.56 |

FOREIGN PATENT DOCUMENTS 1563570 3/1980 United Kingdom .

Primary Examiner—Herbert Goldstein
Attorney, Agent, or Firm—Leydig, Voit & Mayer Ltd.

[57] ABSTRACT

An opto-electronic position sensing system comprising a series of radiation sources, a series of radiation detectors, a moveable member having a range of movement over which it controls irradiation of various ones of said detectors by various ones of said sources according to the position of said member, each detector being adapted to produce an analog signal which varies from a minimum to a maximum with movement of the said member over a corresponding parts of its range in such a manner that the output signal of at least two of said detectors varies with movement of said member whatever its position in the said range of movement, and first means which determine the position of the member by digital analysis of outputs from the detectors and second means which subsequently better determine the position of the member by analog analysis of output from those detectors identified by the first means as indicating the position of the member.

21 Claims, 2 Drawing Figures

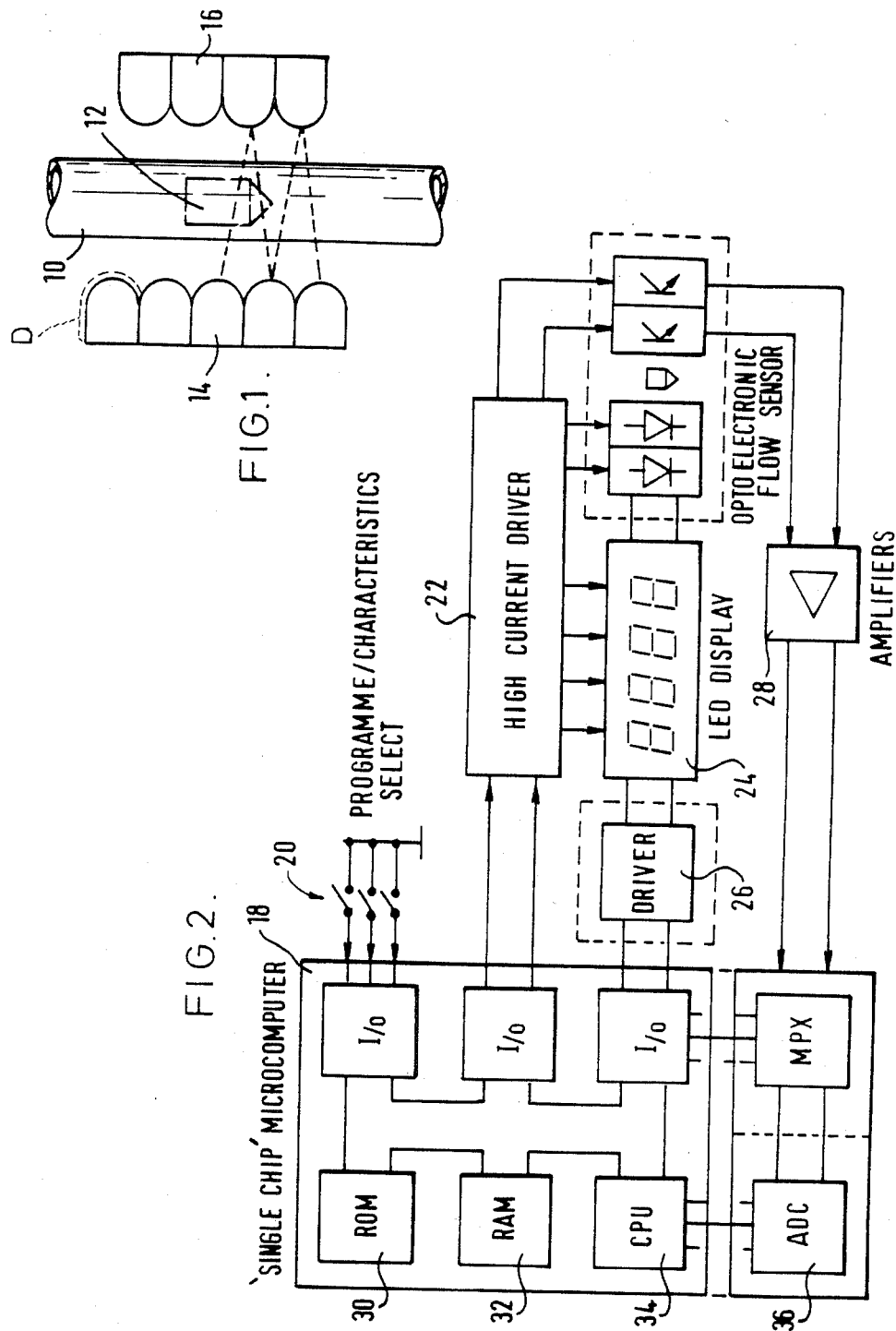

OPTO-ELECTRONIC POSITION SENSING

BACKGROUND OF THE INVENTION

1. Field Of Invention

The present invention relates to a system and method of opto-electronic position sensing.

2. Description Of Prior Art

Opto-electronic position sensing systems for use with flowmeters are known. These consist of an array of emitters facing an array of detectors, each detector being illuminated by and responsive only to a corresponding emitter. The position of a movable member is detected by a digital readout from the detectors thereby identifying the position of the member by its interuption of signals passed from the emitters to the detectors. This known system has several disadvantages. The precision with which the position of the member can be determined is dependent upon the pitch of the array of detectors which reaches a limit when the detectors abut each other. The known system also has the disadvantage that for accurate determination of the position of the member a relatively large number of detectors and emitters will be required. This results in an expensive system.

SUMMARY OF THE INVENTION

With a view to mitigating these disadvantages and establishing a general opto-electronic position sensing system the present invention provides, in a first aspect, an opto-electronic position sensing system comprising a series of emitting sources for generating radiation, a series of radiation detectors for receiving radiation, a movable member located between emitting sources and detectors for affecting radiation reception of various affected elements of said dectectors by blocking radiation from the sources to the affected elements according to its position, each affected element being adapted to produce an analog output signal having a magnitude varying from a minimum to a maximum and responsive to the position of the member in such manner that the output signals of at least two of the affected elements vary in accordance with movement of the member, and first means for identifying said affected elements having low outputs by digital analysis of said output signals from said detectors so as to indicate the position of said member in said system, and second means for subsequently precisely determining the position of the member by analog analysis of outputs from those affected elements identified by the first means.

Preferably, movement of the member is relatively slow and the system comprises means for relatively rapidly energising the sources sequentially and means for relatively rapidly examining the detectors sequentially for affected elements.

BRIEF DESCRIPTION OF DRAWINGS

Embodiments of the present invention will now be described by way of example only and with reference to the accompanying drawings, in which:

FIG. 1 illustrates the use of an opto-electronic position sensing system together with a flow rate sensor, and FIG. 2 is a block circuit diagram showing the electrical system for use with the arrangement of FIG. 1.

DESCRIPTION OF THE PREFERRED EMBODIMENTS

The embodiment of the invention illustrated in the accompanying drawings is used in combination with a flow rate sensor. As shown in FIG. 1 the flow rate sensor comprises a tube 10 and a float 12 within the tube. The tube 10 is transparent and is tapered with its largest cross-sectional area being upper most. Fluid flows up the tube 10 and the float 12 is supported at a position determined by the rate of fluid flow. The position of the float 12 also depends upon its own dimensions, the dimensions of the tube and the characteristics of the fluid.

Conventionally, a scale is associated with the tube 10 and a visual inspection of the position of the float 12 with respect to the scale is used to read off the rate of fluid flow. This technique is imprecise and requires a change of scale, or sensor, for use with different fluids. The opto-electronic position sensing system of this invention can accurately determine the position of the float 12 within the tube 10 and this output may then be used for further electronic processing so as to provide a digital readout of the rate of fluid flow. The characteristic relating to different fluids may be stored in a look-up table and identification of the fluid flowing within the tube 10 can enable the device to display correctly the flow rate for that fluid.

As shown in FIG. 1 the opto-electronic system comprises an array of emitters 14 and an array of detectors 16. The tube 10 is interposed between the emitters 14 and detectors 16. There are 9 emitters and 8 detectors. The emitters are off-set from the detectors by half a pitch so that each detector can view two adjacent emitters, as shown by the chain lines. The emitters 14 are sequentially energised and the detectors 16, examined for affected elements. Therefore sixteen recordings are available from the array of eight detectors. The emitters 14 emit infra red radiation and are switched on/off in sequence under micro processor control. The pitch of the detectors 16 is 0.2 inches (5.08 mm) for use with a float 12 of at least 5 mm in length. The position of the float 12 will be accurately identifiable if the shadow cast by the float 12 on the array of detectors 16 always overlaps the sensitive area of at least two of the detectors. The staggered arrangement of emitters and detectors shown in FIG. 1 overcomes problems associated with reduction in sensitivity at the edges of the field of view.

FIG. 2 is a simplified block diagram of a circuit for activating the emitters 14 and for processing outputs from the detectors 16. According to the present invention, a microprocessor 18 operating under program control provides first means for digital analysis of the outputs from the detectors to determine the position of the float and also provides second means for subsequently determining the position of the float by analog analysis of the detector outputs to obtain a more precise representation of the float position. The circuit comprises a single chip micro processor 18, a number of program select switches 20, a high current driver circuit 22, a light emitting diode display 24, an additional driver 26 for the light emitting diode display 24 and an amplifier 28 which amplifies outputs from the detectors 16. The micro processor 18 has input/output ports associated with corresponding switches 20, the high current driver 22 and the additional driver 26. The high current driver 22 has outputs for driving the light emitting diode display 24 and for driving the elements 14. The micro processor 18 also comprises a ROM 30 which contains programs, a RAM 32 which stores data such as intermediate results and display information, and a CPU 34 which executes the program selected by switches 20. The micro processor 18 also includes analog to digital converters 36.

The micro processor 18 energises the emitters 14 sequentially and relatively rapidly. The detectors 16 are examined sequentially and relatively rapidly by micro processor 18. The speed of movement of float 12 is, by contrast, relatively slow. The position of the float 12 is first determined by digital analysis of outputs from the detectors 16 and is subsequently precisely determined by analog analysis of output from those detectors 16 which digitally identify the position of the float 12. The digital analysis merely consists of identifying those detectors 16 whose output is low. Intermediate levels of output are neglected for the digital analysis. It is a practical problem that each of the detectors 16 will have unique characteristics and similarly each of the emitters 14 can be expected to have unique characteristics. These practical problems can be avoided by obtaining and storing a reference output from each detector 16, that is the output when the float 12 has been removed from the active range of the position sensing system. Prior to the analysis of output from the detectors 16 during normal operation, the respective reference outputs are subtracted from the operative outputs so that only changes in output level are transferred for processing.

A coarse indication of the position of float 12 is given by the digital analysis and the precise algorithm used for the subsequent analog analysis can vary so as to best suit the flow rate sensor and the transducer arrays used with that sensor.

The above specified dimensions for the arrangement shown in FIG. 1 results in the shadow of the float 12 effecting the outputs of at least 2 of the detectors 16. The algorithm for analog analysis computes the sum and difference values from the outputs of the two detectors 16 which were identified by the digital analysis as indicating the position of the float 12. The ratio of the sum and difference values is considered to indicate the proportional position of the float 12 with respect to the two detectors 16. The position of the float 12 is thus accurately determined by the combined use of digital and analog analysis. It will be appreciated that the precision with which the position of the float 12 can be determined is much enhanced as compared with the prior art purely digital technique, especially when the detectors 16 are located with minimum pitch. Alternately, the number of detectors and emitters required for a specified level of precision can be reduced.

The above described analog algorithm may be refined in the following manner. An output from a detector 16 adjacent the two detectors identified by the digital analysis is obtained. Three analog signals are thus available for processing and the smallest of the analog signals is subtracted from all three values so as to leave only two non-zero values remaining. The sum and difference of these two values are calculated and their ratio is again considered to indicate the proportional position of the float 12 between the two detectors.

An alternative analog algorithm is based upon edge detection. If the final output of a detector 16 is a certain percentage of its maximum output then it can be assumed that the float 12 is displaced within the spatial range of that detector with a proportion corresponding to the said percentage. This algorithm can be refined by adding in extra signals from adjacent detectors. This algorithm is considered suitable for flow rate sensors having floats larger than 5 mm in length.

The described algorithms can be carried out by programs stored in the ROM 30 of the micro processor 18.

Results of the digital and analog analysis are stored in RAM 32. The information can be combined with data relating to the dimensions of tube 10 and float 12 and data relating to characteristics of the fluid flowing in the sensor. This information is processed so as to provide a digital readout on the display 24. The system may be further embellished by the provision of features as high and/or low flow rate alarm warnings.

Any range of commercially available microprocessors can be used to implement the described arrangement and each type of microprocessor will provide different capabilities. Therefore it may be necessary to add components, such as RAM, to the standard component. Standard programming techniques are employed to implement the described algorithms in a form suitable for processing by the standard microprocessors.

Details of the above described embodiment can be varied or enhanced. For example, where the size of flow meter or required precision permits, the staggered array of detectors and emitters can be replaced by aligned arrays in which each emitter illuminates only a respective detector. A further alternative is that the float 12 can be used to reflect radiation from the emitters onto the detectors. Many variations of the spatial relationship between the emitters and detectors are therefore possible.

The use of sequential energisation of the emitters has been described. This feature has been found advantageous for use with a flow rate sensor and is useful in avoiding fringing effects which may otherwise occur. Sequential energisation of the emitters is not, however, considered to be essential for all applications of the position sensing system.

Further enhancement of the position sensing system may result from examining the detectors sequentially in groups, group-by-group. Advantageously the groups may each include a detector from a preceding group and a detector from a succeeding group.

It has been found that optimum results may be obtained when radiation from each emitter is constant over its region of illumination of the detector array and when there are no regions of the detector array which remain unilluminated. These conditions are dependent upon the emission angle of the emitters and the view angle of the detectors. Optical systems may be included to optimise these features and one method which can achieve good results relatively inexpensively is to diffuse emission from the emitters. This can be achieved by encapsulating the emitters in a substance D such as silicone resin having a calcium carbonate filler.

Examples of radiation which may be emitted by the emitters 14 are: light, infra red, ultra violet, sonic radiation.

What I claim is:

1. An opto-electronic position-sensing system comprising:
   a series of emitting sources for generating radiation,
   a series of radiation detectors for receiving said radiation,
   a movable member located between said emitting sources and said detectors for affecting radiation reception of various affected elements of said detectors by blocking radiation from said sources to said elements according to a longitudinal position of said member relative to said sources, each affected element being adapted to produce an analog output signal having a magnitude varying from a minimum to a maximum and responsive to said position of said member in such a manner that output signals of at least two of said elements of said detectors vary in accordance with movement of said member, first means for identifying said affected elements having low outputs by digital analysis of said output signals from said detectors so as to indicate the position of said member in said system, and second means for subsequently precisely determining said position of said member by analog analysis of said output signals from said affected elements identified by said first means.

2. A system as claimed in claim 1 wherein said second means includes calculating means for calculating a ratio of the sum and difference of said output signals from said affected elements identified by said first means so as to indicate the position of said member in said system.

3. A system as claimed in claim 2 wherein said first means identifies three affected elements from said detectors by said digital analysis and said second means subtracts one of said three signals having the smallest magnitude output from said three output signals to obtain two non-zero values for determining said position of said member.

4. A system as claimed in claim 1 wherein movement of said member is relatively slow and said system further comprises energizing means for relatively rapidly energizing said sources sequentially and determining means for relatively rapidly examining said detectors sequentially for affected elements.

5. A system as claimed in claim 1 wherein each of said radiation sources irradiates only a respective detecting element of said radiation detectors.

6. A system as claimed in claim 1, wherein said member variably, according to its position, reflects radiation from said sources towards said detectors.

7. A system as claimed in claim 1 further comprising diffusing means for diffusing said radiation from each source.

8. A system as claimed in claim 1 wherein said member is a fluid flow sensor member in a tube.

9. An opto-electronic position-sensing system comprising:

a series of emitting sources for generating radiation,
a series of radiation detectors for receiving said radiation,
a movable member located between said emitting sources and said detectors for affecting radiation reception of various affected elements of said detectors by blocking radiation from said sources to said elements according to a longitudinal position of said member relative to said sources, each affected element being adapted to produce an analog output signal having a magnitude varying from a minimum to a maximum and responsive to said position of said member in such a manner that output signals of at least two of said elements of said detectors vary in accordance with movement of said member,
first means for identifying said affected elements having low outputs by digital analysis of said output signals from said detectors so as to indicate the position of said member in said system, and
second means for subsequently precisely determining said position of said member by analog analysis of said output signals from said affected elements and by comparing an output magnitude from each of said affected elements with the magnitude of the respective output when the element is unaffected by said member.

10. An opto-electronic position-sensing system comprising:

a series of emitting sources for generating radiation,
a series of radiation detectors for receiving said radiation,
a movable member located between said emitting sources and said detectors for affecting radiation reception of various affected elements of said detectors by blocking radiation from said sources to said elements according to a longitudinal position of said member relative to said sources, each affected element being adapted to produce an analog output signal having a magnitude varying from a minimum to a maximum and responsive to said position of said member in such a manner that output signals of at least two of said elements vary in accordance with movement of said member,
first means for identifying said affected elements having low outputs by digital analysis of said output signals from said detectors so as to indicate the position of said member in said system,
second means for subsequently precisely determining said position of said member by analog analysis of said output signals from said affected elements identified by said first means,
storage means for storing a reference output for each element, said reference output being an output of that element when unaffected by said member, and
subtraction means for subtracting said reference outputs from respective output signals of said detectors.

11. An opto-electronic position-sensing system comprising:

a series of emitting sources for generating radiation,
a series of radiation detectors for receiving said radiation, said series of detectors being offset with respect to said series of sources whereby each detector is irradiated by two radiation sources,
a movable member located between said emitting sources and said detectors for affecting radiation reception of various affected elements of said detectors by blocking radiation from said sources to said elements according to a longitudinal position of said member relative to said sources, each affected element being adapted to produce an analog output signal having a magnitude varying from a minimum to a maximum and responsive to said position of said member in such a manner that output signals of at least two of said elements of said detectors vary in accordance with movement of said member,
first means for identifying said affected elements having low outputs by digital analysis of said output signals from said detectors so as to indicate the position of said member in said system, and
second means for subsequently precisely determining said position of said member by analog analysis of said output signals from said affected elements identified by said first means.

12. A method of opto-electronic position-sensing comprising:

providing a series of emitting sources for generating radiation, a series of radiation detectors for receiving said radiation, and a movable member located between said emitting sources and said detectors for affecting radiation reception of various detecting elements of said detectors by blocking radiation from said sources to said elements according to a longitudinal position of said member relative to said sources, arranging each detector to produce an analog output signal having a magnitude varying from a minimum to a maximum in response to said position of said member in such a manner that output signals of at least two of said detectors vary in accordance with movement of said member, and identifying said affected element having non-outputs by digital analysis of outputs from said detectors and subsequently determining the position of said member by analog analysis of outputs from said affected elements being identified by digital analysis.

13. A method as claimed in claim 12 wherein said analog analysis includes calculating the ratio of the sum and difference of said outputs from said affected elements being identified by digital analysis.

14. A method as claimed in claim 13 wherein said digital analysis of said outputs from said detectors includes identifying three elements affected by said member and wherein said analog analysis includes subtracting the smallest magnitude output of said three outputs from all three outputs of the said detectors.

15. A method as claimed in claim 12 further including relatively rapidly energizing the sources sequentially and relatively rapidly examining said detectors sequentially for affected elements.

16. A method as claimed in claim 12 further including arranging said emitting sources and said radiation detectors such that each emitting source irradiates only a respective detecting element of said radiation detectors.

17. A method as claimed in claim 12 including arranging the radiation sources, the radiation detectors and the member such that the member variably, according to its position, reflects radiation from said sources towards said detectors.

18. A method as claimed in claim 12 including diffusing said radiation from each source.

19. A method of opto-electronic position-sensing comprising:
providing a series of emitting sources for generating radiation, a series of radiation detectors for receiving said radiation, and a movable member located between said emitting sources and said detectors for affecting radiation reception of various detecting elements of said detectors by blocking radiation from said sources to said elements according to a longitudinal position of said member relative to said sources, arranging each detector to produce an analog output signal having a magnitude varying from a minimum to a maximum in response to said position of said member in such a manner that output signals of at least two of said detectors vary in accordance with movement of said member, and identifying said affected elements having low outputs by digital analysis of said outputs from said detectors and subsequently precisely determining the position of said member by analog analysis of outputs from said affected elements being identified by digital analysis, said analog analysis includes comparing the output magnitude of each of said identified elements with the magnitude of the respective output when that element is unaffected by said member.

20. A method of opto-electronic position-sensing comprising:
providing a series of emitting sources for generating radiation, a series of radiation detectors for receiving said radiation, and a movable member located between said emitting sources and said detectors for affecting radiation reception of various detecting elements of said detectors by blocking radiation from said sources to said elements according to a longitudinal position of said member relative to said sources, arranging each detector to produce an analog output signal having a magnitude varying from a minimum to a maximum in response to said position of said member in such a manner that output signals of at least two of said detectors vary in accordance with movement of said member, identifying said affected elements having low outputs by digital analysis of outputs from said detectors and subsequently precisely determining the position of said member by analog analysis of outputs from said affected elements being identified by digital analysis, and storing a reference output from each detector, said reference output being an output of that detector when unaffected by said member, and subtracting said reference output from the respective output signals of said detectors.

21. A method of opto-electronic position-sensing comprising:
providing a series of emitting sources for generating radiation, a series of radiation detectors for receiving said radiation, and a movable member located between said emitting sources and said detectors for affecting radiation reception of various detecting elements of said detectors by blocking radiation from said sources to said elements according to a longitudinal position of said member relative to said sources, arranging each detector to produce an analog output signal having a magnitude varying from a minimum to a maximum in response to said position of said member in such a manner that output signals of at least two of said detectors vary in accordance with movement of said member, identifying said affected elements having low outputs by digital analysis of outputs from said detectors and subsequently precisely determining the position of said member by analog analysis of outputs from said affected elements being identified by digital analysis, and offsetting said series of detectors with respect to said series of said sources such that each detector is irradiated by two radiation sources.

* * * * *